UNITED STATES PATENT OFFICE.

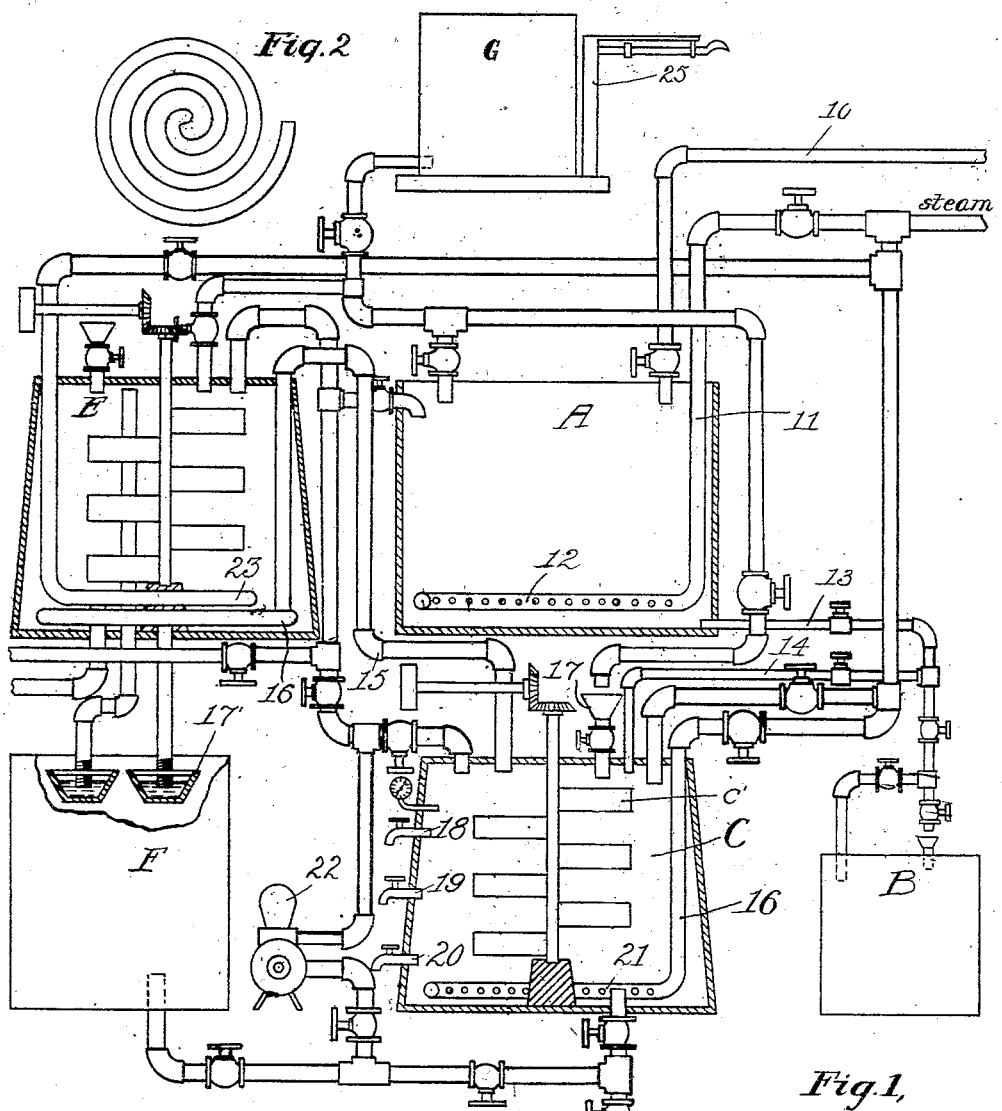

BALTHASAR E. REUTER, OF CHICAGO, ILLINOIS.

PROCESS FOR THE DECOMPOSITION OF FATS AND OILS.

1,068,079.

Specification of Letters Patent.

Patented July 22, 1913.

Application filed August 7, 1911. Serial No. 642,704.

*To all whom it may concern:*

Be it known that I, BALTHASAR E. REUTER, a citizen of the United States, residing at Chicago, in the county of Cook and State of Illinois, have invented a certain new and Improved Process for the Decomposition of Fats and Oils, of which the following is a full, clear, concise, and exact description, reference being had to the accompanying drawings, forming a part of this specification.

My invention relates to an improved process for the treatment of fats or oils, the object being primarily to decompose the fats or oils, to recover glycerin therefrom and to render the fatty acids free from discoloration.

It is the object of my invention, furthermore to attain these results efficiently and economically, and without destruction or loss either of the fatty acids or of the glycerin.

In some respects my present invention is an improvement upon the Twitchell process described in Patent No. 601,603, dated March 29, 1898, and, indeed, in carrying out the process of my invention I have made use of the Twitchell re-agent described as a fatty aromatic sulfo-compound in Patent No. 628,503, dated July 11, 1899.

In carrying out the Twitchell process referred to above the fatty acids are discolored as a result of the decomposition of the fats and oils, if it is attempted to recover the glycerin content to a commercially profitable extent and if, on the other hand, the decomposition is stopped under this process before the fatty acids are discolored, a large part of the glycerin remains with the fats and oils and is lost so far as being separately available is concerned.

Before describing my apparatus and process in detail, it may be well to outline the several steps involved in the decomposition, recovery and bleaching.

The oils or fats are first treated to an acid wash. The clear fats or oils are then conveyed to an air-tight saponification tank, in which they are treated with a reagent such as that described in the Twitchell patent above mentioned, and where, during the process of decomposition, they are subjected to heat and agitation in a manner presently to be described. Then follows a settling process in which the contents of the saponification tank are subjected intermittently to heating and agitation. Presently the contents of the tank are allowed to settle, while a steam seal serves to prevent atmospheric air coming in contact with the contents of the tank. The settling having been effected, the solution of glycerin in water (sweet water) is drawn from the bottom of the saponification tank. The fats remaining in the saponification tank are for a second and third time subjected to similar treatment to effect the complete decomposition of the fats and the separation of practically the entire glycerin content. Throughout this decomposition, air is carefully excluded from contact with the contents of the saponification tank. The sweet water is drawn from the tank at the end of each treatment. In each instance before attempting to draw the sweet water from the saponification tank, I add a small quantity of 60° Bé. sulfuric acid to aid in breaking the emulsion and in causing the water to separate from and settle out of the fatty acids. If the fats or oils are of good color to start with and if the air is carefully excluded from coming in contact with the fats during their treatment in the saponification tank, and if but a small quantity of the reagent is used in successive stages, as above described, the resulting fatty acids will be of good color. In case it is desired, however, to improve the color of the fatty acids resulting after the decomposition has been effected, I add water and decrolin, and bring the contents to a boil while agitating the mixture. Presently the contents of the bleaching tank are neutralized, and then after intermittent agitation, are allowed to settle, when the fatty acids of perfect color are ready for use in the manufacture of soap, etc.

In carrying out my process I find it desirable to treat the fats or oils to be decomposed in successive operations, only a small amount of reagent being used in connection with each treatment. At the same time I preferably employ a very small percentage of sulfuric acid—just enough to make the mixture slightly acid. During each treatment the mixture is made, by agitation or boiling, or both, to take the form of an emulsion, as a result of which the fats or oils are broken up into small particles and the reagent is brought into contact with each of these small particles, thus producing a thorough decomposition of the fats or oils. The emulsion is more easily formed when only a small quantity of sulfuric acid is used. If a larger amount of acid were used in connection with the decomposing operation it would tend to settle the contents of the tank, thus separating the reagent from the fats or oils instead of leaving them in intimate contact to facilitate the decomposition.

After the decomposition of the fats or oils has been accomplished in any particular operation to the extent that can be readily secured by the amount of reagent employed sulfuric acid is added to the mixture to break up the emulsion and settle the glycerin water and reagent from the fatty acids.

The above outline is set forth simply in order to give a comprehensive idea of the process before describing the details which in large measure are responsible for the very successful results attained in the use of my invention.

Coming now to the detailed description, reference may be had to the accompanying drawing, in which,—

Figure 1 is a diagrammatic representation of the apparatus employed; and Fig. 2 is a detail sketch of a steam heating coil, perhaps not clearly shown in the main figure.

In the drawings, A indicates the acid treating or wash tank, B a tank for the storage of wash water recovered from A.

C represents the saponification tank with its agitator $c'$.

D indicates the sweet water or glycerin storage tank.

E represents a tank for storing and bleaching the fatty acids recovered from the saponification tank C.

F represents the condensed or distilled water tank.

The other details of the apparatus can be followed in conjunction with the detailed description of the process as carried on in this apparatus.

A charge of melted fats or oils is run through the pipe 10 into the tank A. This tank is open, and preferably lined with lead or other material not subject to the attack of sulfuric acid. The charge is brought to a boil by means of steam supplied through the pipe 11 to the jets of the coil 12 in the bottom of the tank. From 1/2% to 2% of sulfuric acid (60° Bé.) is added to the charge, and the mixture boiled from one to two hours. This clarifies the fats and oils and gives them a wash. Thereupon the contents of the tank A are allowed to settle for from one to twelve hours, as may be necessary, one or two hours' settling generally being sufficient. When the settling is complete, I draw off the acid water and settlings through the pipe 13 leading to the acid-water storage tank B, from which any acid glycerin, fats or fatty acids may be recovered, as subsequently explained.

The clear fats or oils left in the wash tank A are then run through the pipe 14 to the saponification tank C. It will be noted that this saponification tank is air tight. A relief and exhaust pipe 15 leads, however, from the top of this tank, first, through the condensing coil 16 in the bottom of tank E, and then below the surface of water in the overflow cup 17' located in the upper part of the water tank F. This arrangement permits the escape of steam from the top of the tank C, thereby preventing the pressure from rising in the tank C, and preventing also a rise of temperature above 212° Fahrenheit. About 40% of condensed or distilled water is added to the fats or oils run into the saponification tank C and the mixture is brought to a boil by the admission of live steam through the pipe 16. About 1/10% of the Twitchell reagent is added through the funnel 17, whereupon the contents of this tank are kept at a temperature of 212° Fahrenheit, while the agitator $c'$ is set in motion to mix thoroughly the contents of the tank. Presently a sample is drawn through one or more of the cocks, 18, 19 and 20, and a test made to determine the percentage of sulfuric acid in the water. If necessary, 60° Bé. sulfuric acid is added until the mixture shows a content of about .05% (five one-hundredths of one per cent.)

The contents of the saponification tank are then boiled for about one hour, with the agitator constantly in motion, when the supply of steam is reduced to a point where the contents of the tank will be kept at a temperature between 200° and 212° Fahrenheit, the agitator being brought to a stop. The temperature is thus maintained between 200° Fahrenheit and 212° Fahrenheit for from twelve to eighteen hours. At intervals during this period the contents of the saponification tank are brought up to a temperature of 212° Fahrenheit for a few minutes, at a time, and at intervals, in like manner the agitator is set in motion for from ten minutes to half an hour at a time. The recurrent raising of the temperature of the contents of the saponification tank aids the decomposition as also does the agitation caused by the sprays of steam entering the bottom of the tank through the openings in the coiled pipe 16. The use of the mechanical agitator aids in like manner and saves steam. This treatment maintains the contents of the saponification tank in the form of an emulsion and brings the reagent into intimate contact with the particles of fat or oil to be decomposed. Since the decomposition is effected at a low temperature, I prevent the volatilization of fatty acids and glycerin which at a higher temperature would go over by distillation into the water tank F. Furthermore, the decomposition is more complete at the low temperature, coupled with intermittent agitation, as above described, than is the case at a higher temperature.

Any increase in pressure and temperature in the saponification tank would tend to effect a re-combination of the glycerin and fatty acids to form fats or oils, especially after the decomposition nears its final stages. Such synthesis is entirely prevented by the use of a low temperature and the absence of pressure.

About half an hour before the end of the 12 or 18 hours decomposition, a small amount of 60° Bé. acid is added to break up the emulsion. The contents of the tank are then heated to about 212° Fahrenheit, and then with the steam turned off the agitator c' is set in motion for about half an hour, after which the agitator is stopped and the contents are allowed to settle for from half an hour to six hours. The added sulfuric acid serves to break up the emulsion produced in the saponification tank during the decomposing operation and settles the mixture, carrying down the glycerin water and reagent so that they may be withdrawn from the saponification tank, leaving the fatty acids and fats and oils not yet decomposed, for further treatment. The glycerin and water are then drawn from the bottom of the tank C, from which they run into the sweet-water storage tank D. The thorough agitation just prior to the settling in the tank C serves to mix thoroughly the contents of the tank, so that during the settling the water will percolate down through the fats and wash out all of the free glycerin and the reagent, which might otherwise be mechanically entrained in the fats.

In the above explanation I have given figures as closely as possible for average conditions, but these figures may be varied somewhat, depending upon the nature of the fats and oils under treatment.

After the first settling of sweet water has been withdrawn from the tank C, I again add water, this time about 30%. The contents having been brought to a boil and the agitator set in motion, I again add about 1/10% of the Twitchell reagent and test for sulfuric acid, as before. If during this second treatment the acid content of the water is found to be less than .05%, I add 60° Bé. sulfuric acid until the water contains this percentage of acid. After boiling for an hour under mechanical agitation, the steam is turned down so as to bring the temperature to a point somewhere between 200° Fahrenheit and 212° Fahrenheit. At intervals, as before, the temperature is raised to the boiling point for from ten to thirty minutes at a time, and the mechanical agitator is periodically set in motion for about the same length of time. After twelve or eighteen hours, a small quantity of 60° Bé. sulfuric acid is added to break the emulsion. The contents of the saponification tank are then allowed to settle, as before, and the second settling of sweet water is allowed to run into the sweet-water tank D. I now subject the fats and fatty acids remaining in the saponification tank to a third treatment substantially like the first and second treatments already described. For this purpose approximately 30% of water is added and the mixture brought to a boil, the reagent is added, the test is made for sulfuric acid and the acid content corrected, if need be. The mixture is intermittently heated to the boiling point and agitated, both by means of the spray and mechanically, as already described, this third treatment being continued, as before, for from twelve to eighteen hours. Just prior to the conclusion of this treatment a small quantity of sulfuric acid is added to break up the emulsion, thereby causing the more effective separation of the glycerin water. Then for half an hour to six hours the mixture is allowed to settle. The third washing of glycerin water is drawn from the bottom of the saponification tank at the conclusion of this third treatment.

In stating the above figures as to quantity, duration, etc., I have assumed average conditions and the treatment of fats or oils of the kind most commonly handled in the manufacture of soap and candles. The conditions of a special case may require some variation from these figures in order to give the best possible result.

The sweet water recovered from the saponification tank is evaporated to form the crude glycerin of commerce, which, of course, may be refined in accordance with the methods now in common practice.

In connection with the treatment of certain fats and oils it is desirable to bleach the resulting fatty acids and this I preferably accomplish by means of the bleaching process shown and described in my copending application, Serial No. 730,214, filed November 8th, 1912.

A number of recoveries may be made. Sulfuric acid may be recovered from the tank B, or the mixture in this tank may be used in a soap factory for neutralizing the waste lyes from the soap kettles, any glycerin and fatty acid contained in this wash water being recovered in that process of neutralization.

Notwithstanding the precaution which I take, some glycerin and some of the fatty acids may be distilled over into the water tank F. Since the water which is added from time to time to the contents of the saponification tank is drawn from the tank F, any admixture of a fatty acid or glycerin will be carried back into the saponification tank, where the glycerin will find its way out to the tank D, and where the fatty acid will become a part of the main body of fatty acids resulting from the decomposition which is going on in this saponification tank.

While the drawing represents the apparatus in diagrammatic shape, it will, I think, serve the purpose of the manufacturer desiring to construct a plant to carry on the process of my invention. I have not attempted to mention all of the valves in detail, nor to explain their use, as these things will be apparent at once from an inspection of the drawings. It may be well to state, however, that the tank G contains the supply of sulfuric acid, this tank being placed upon the scales 25 to facilitate weighing the quantities of acid which are added from time to time to the contents of the several tanks heretofore described.

The apparatus required for carrying on my invention is comparatively simple, there are no delicate chemical manipulations which cannot be carried on successfully by the average workman, and yet the results in the way of efficiency in decomposition and economy in recoveries have been extremely gratifying. For example, I have handled, in a single plant some 90,000 pounds of fats and oils of very average grade per week. They have been completely decomposed, and I have been able to recover more than 99% of the total glycerin content as against a total recovery of from 75 to 80%, which is the best that has been accomplished commercially in the use of the methods of the prior art. Furthermore, the color of the fatty acids recovered has been extremely good even without bleaching, and when bleached the color has been as nearly perfect as could be asked. The far higher value of the superior fatty acids as obtained in the use of my process and the largely increased recovery of glycerin would in themselves make the process a very valuable one, but in addition to the increased value of the products of decomposition, my invention enables the recovery to be made at less cost than in the use of other processes of the prior art.

The various chemicals required in carrying out my process are used in but small quantities and the system of tanks and piping is arranged to effect the utmost economy in the use of steam.

Having described in more or less detail the apparatus and the process which constitute my invention, I wish it to be understood that my claims are to be taken as the measure of my invention, rather than the detailed description of the various steps and apparatus.

What I claim as my invention is:

1. The process of decomposing glycerids into glycerin and acids, which consists in successively heating emulsions of the charge with different restricted portions of sulfofatty-acid, at temperatures insufficient to substantially volatilize the decomposition-products.

2. The process of decomposing glycerids into glycerin and acids, which consists in successively heating emulsions of the charge with different restricted portions of sulfofatty-acid, at temperatures not substantially above 212° F., at substantially atmospheric pressure.

3. The process of decomposing glycerids into glycerin and acids, which consists in successively heating emulsions of the charge with different restricted portions of a sulfofatty-acid, at temperatures not substantially above 212° F., at substantially atmospheric pressure, and removing the aqueous solution of glycerin and spent reagent after each treatment.

4. The process of decomposing glycerids into glycerin and acids, which consists in successively heating unsaponified emulsions of the entire body to be decomposed with different portions of a sulfo-fatty-acid catalyzer, each portion being insufficient to effect complete decomposition, with substantial exclusion of air, and removing the aqueous solution of glycerin and spent reagent after each treatment.

5. The process of decomposing glycerids into glycerin and acids, which consists in successively heating unsaponified emulsions of the entire body to be decomposed with different portions of a sulfo-fatty-acid catalyzer, each portion being insufficient to effect complete decomposition, with substantial exclusion of air, at temperatures insufficient to substantially volatilize the decomposition-products, and removing the aqueous solution of glycerin and spent reagent after each treatment.

6. The process of decomposing glycerids into glycerin and acids, which consists in successively heating unsaponified emulsions of the entire body to be decomposed with different portions of a sulfo-fatty-acid catalyzer, each portion being insufficient to effect complete decomposition, with substantial exclusion of air, at temperatures not substantially above 212° F., at substantially atmospheric pressure, and removing the aqueous solution of glycerin and spent reagent after each treatment.

7. The process of decomposing glycerids into glycerin and acids, which consists in successively heating unsaponified emulsions of the entire body to be decomposed, containing a small amount of sulfuric acid, with different portions of a sulfo-fatty-acid catalyzer, each portion being insufficient to effect complete decomposition, with substantial exclusion of air, at temperatures not substantially above 212° F., at substantially atmospheric pressure, and removing the aqueous solution of glycerin and spent reagent after each treatment.

8. The process of decomposing glycerids into glycerin and acids, which consists in successively heating unsaponified emulsions of the entire body to be decomposed, containing a small amount of sulfuric acid, with different portions of a sulfo-fatty-acid catalyzer, each portion being insufficient to effect complete decomposition, with substantial exclusion of air, at temperatures not substantially above 212° F., at substantially atmospheric pressure, and adding sufficient sulfuric acid to break the emulsion and cause precipitation of the solution of glycerin and spent reagent, and settling and removing said precipitated solution, after each treatment.

9. The process of decomposing glycerids into glycerin and acids, which consists in successively mechanically agitating unsaponified emulsions of the entire body to be decomposed with different portions of a sulfo-fatty-acid catalyzer, each portion being insufficient to effect complete decomposition, successively heating said emulsions, with substantial exclusion of air, at temperatures not substantially above 212° F., at substantially atmospheric pressure, and removing the aqueous solution of glycerin and spent reagent after each treatment.

10. The process of decomposing glycerids into glycerin and acids, which consists in successively agitating, by mechanical stirring and steam-jets, unsaponified emulsions of the entire body to be decomposed with different portions of a sulfo-fatty-acid catalyzer, each portion being insufficient to effect complete decomposition, successively heating said emulsions, with substantial exclusion of air, at temperatures not substantially above 212° F., at substantially atmospheric pressure, and removing the aqueous solution of glycerin and spent reagent after each treatment.

11. The process of decomposing glycerids into glycerin and acids, which consists in successively heating emulsions of the charge with different restricted portions of a sulfo-fatty-acid, and removing the aqueous solution of glycerin and spent reagent after each treatment.

12. The process of treating fats or oils which consists in heating the fats or oils, adding sulfuric acid and water thereto, boiling and agitating the mixture, separating the water from the mixture, mixing with the fats or oils in a closed tank about forty per cent. of water, adding to the mixture from one-tenth to four-tenths per cent. of the Twitchell reagent, adding sulfuric acid to the mixture to make the acid content from three-hundredths per cent. to one-tenth per cent., boiling the mixture out of contact with the air and without the application of pressure thereto, agitating the mixture during the boiling operation, adding sulfuric acid to break the emulsion, allowing the mixture to separate into its constituent parts by settling, drawing off the sweet water from the bottom of the tank, and subjecting the remaining fats or oils to a repetition of the treatment recited.

13. The process of treating fats or oils which consists in mixing with the fats or oils to be treated about forty per cent. of water in a closed tank, adding from one-tenth per cent. to four-tenths per cent. of the Twitchell reagent, adding sulfuric acid to the mixture to make the acid content from three-hundredths per cent. to one-tenth per cent., boiling the mixture out of contact with the air and without the application of pressure thereto, agitating the mixture during the boiling operation, adding sulfuric acid to break the emulsion, allowing the mixture to separate into its constituent parts by settling, drawing off the sweet water from the bottom of the tank, and subjecting the remaining fats or oils to a repetition of the treatment recited.

14. The process of treating fats or oils which consists in heating the fats or oils, adding sulfuric acid and water thereto, boiling and agitating the mixture, separating the water from the mixture, mixing with the fats or oils in a closed tank about forty per cent. of water, adding to the mixture from one-tenth to four-tenths per cent. of the Twitchell reagent, adding sulfuric acid to the mixture to make the acid content from three-hundredths per cent. to one-tenth per cent., boiling the mixture out of contact with the air and without the application of pressure thereto, agitating the mixture mechanically and repeatedly for short intervals during the boiling operation, adding sulfuric acid to break the emulsion, allowing the mixture to separate into its constituent parts by settling, drawing off the sweet water from the bottom of the tank, and subjecting the remaining fats or oils to a repetition of the treatment recited.

15. The process of treating fats or oils which consists in mixing with the fats or oils to be treated about forty per cent. of water in a closed tank, adding from one-tenth per cent. to four-tenths per cent. of the Twitchell reagent, adding sulfuric acid to the mixture to make the acid content from three-hundredths per cent. to one-tenth per cent., boiling the mixture out of contact with the air and without the application of pressure thereto, agitating the mixture mechanically and repeatedly for short intervals during the boiling operation, adding sulfuric acid to break the emulsion, allowing the mixture to separate into its constituent parts by settling, drawing off the sweet water from the bottom of the tank, and subjecting the remaining fats or oils to a repetition of the treatment recited.

In witness whereof, I hereunto subscribe my name this 4th day of August A. D. 1911.

BALTHASAR E. REUTER.

Witnesses:
HARVEY L. HANSON,
A. G. McCALEB.